United States Patent [19]
Richey

[11] 3,913,502
[45] Oct. 21, 1975

[54] METHOD OF FARMING
[76] Inventor: Clarence B. Richey, 2217 Delaware Drive, West Lafayette, Ind. 47906
[22] Filed: Sept. 17, 1973
[21] Appl. No.: 398,246

[52] U.S. Cl. .............................. 111/1; 47/9; 56/504
[51] Int. Cl.² ............................................ A01C 1/00
[58] Field of Search ................. 111/1; 47/9; 56/504; 171/24

[56] References Cited
UNITED STATES PATENTS
2,748,535   6/1956   Skromme et al. ........................... 47/9
3,770,064   11/1973   Scarnato et al. ................... 56/504 X Primary Examiner—Stephen C. Pellegrino

[57] ABSTRACT

A method of farming in which crop residue from a previous crop is shredded and elevated, ridges formed and the residue placed in the valleys between the ridges.

4 Claims, 3 Drawing Figures

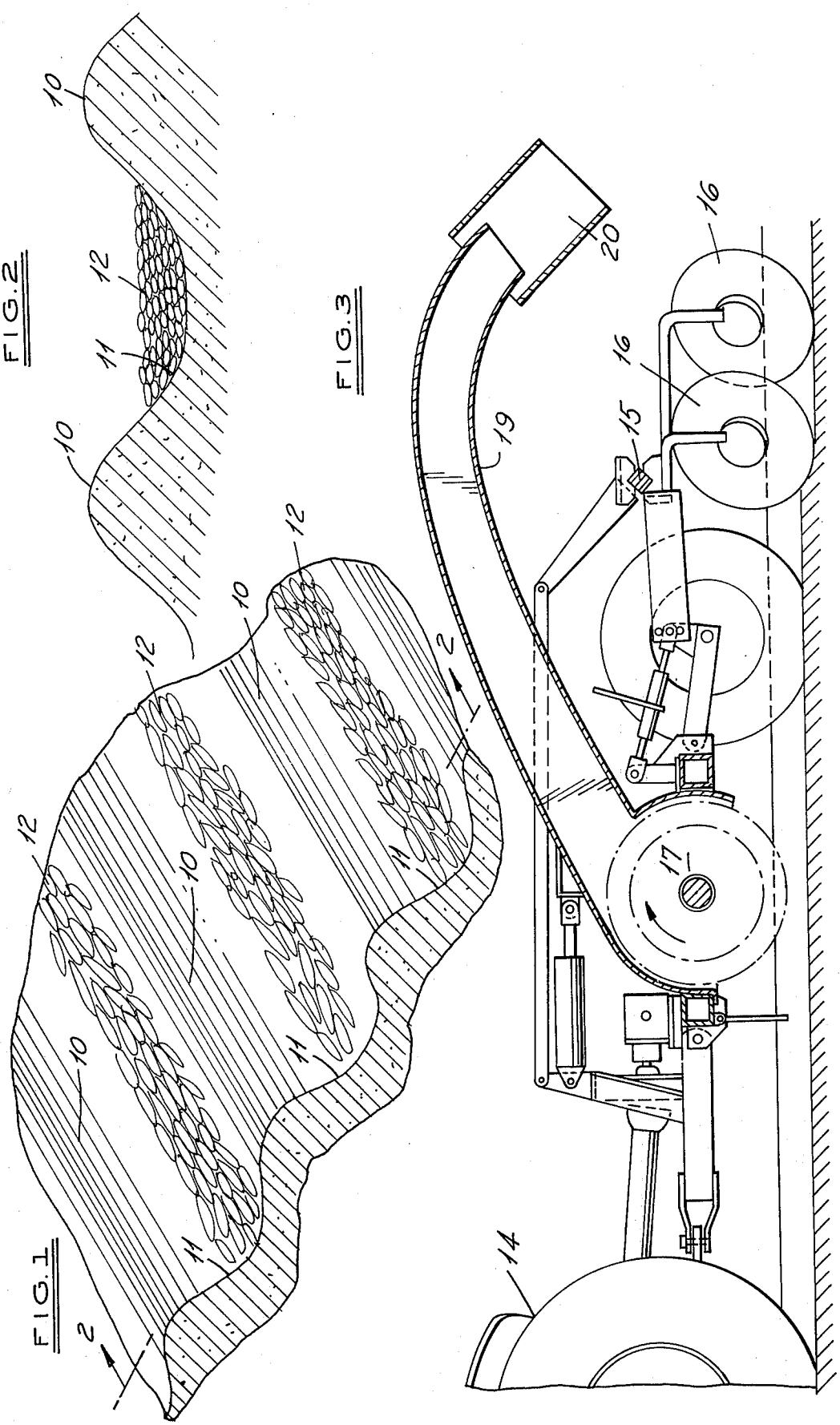

METHOD OF FARMING

This invention relates to an improved method of farming and more particularly to such a method in which the land on which a previous crop; e.g., corn, has been grown is ridged by means of hilling discs, the crop residue remaining in the field being lifted up ahead of the hilling discs and then deposited in the just-formed valleys. The entire operation is performed in a single pass over the field, the crop residue being picked up ahead of the hilling discs so as not to interfere with the ridging operation and being redeposited on the soil surface behind the discs, preferably in the valleys.

The practice of the present invention facilitates drying out of the ridges in the spring and, by removal of the crop residue to the valleys, causes the ridges to warm more quickly than the adjacent valleys, thus permitting earlier planting and increased yields, particularly in areas in which the yield is limited by the length of growing season.

Practice of the present invention also reduces tillage, resulting in savings in fuel and labor and reducing ground compaction.

The primary objects of the present invention are to provide an improved method of fall tillage in which erosion during the fallow season is reduced, in which spring planting and seed germination is accelerated, and generally to improve methods of soil preparation for row crop planting.

Other objects and objects relating to details of practice of the method will be apparent from the detailed description to follow, in which apparatus for practicing the method of the present invention is generally described.

In the drawings:

FIG. 1 is a top perspective view of a portion of a field ridged and mulched according to the present invention.

FIG. 2 is a cross-section of the field, taken along the line 2—2 of FIG. 1.

FIG. 3 is a side elevation of a tractor and implements for practicing the method of the present invention.

Referring now to FIGS. 1 and 2, a field according to the present invention has a series of ridges 10 separated by adjacent valleys 11, formed by hilling discs which are mounted on a tool bar in a well-known manner. The ridges are bare and any crop residue, stalks, trash, etc. 12 remaining in the field after harvesting the previous crop are lying in the valleys. Preferably, the ridges are reformed and the stalks and trash shredded and deposited in the valleys before winter. This allows fall preparation of the soil without erosion of the field during the winter and the ridges, being bare, warm up more rapidly in the spring, providing earlier germination of the seed and a somewhat longer growing season; thus contributing to a higher yield per acre. Also, the field requires no spring preparation, only a single pass being needed to plant the new crop in the ridges, thus contributing to earlier planting and a higher yield per acre. In practicing the invention, the existing ridges in the field may be reformed or new ridges may be formed.

Preferably, the stalks and trash are shredded and then elevated and passed rearwardly over the hilling discs while the ridges are being formed. This procedure removes the crop residue from the path of the hilling discs and permits formation of ridges relatively free from residue. The shredded stalks, trash, etc are deposited in the valleys a short distance behind the hilling discs. The entire procedure is accomplished in a single pass. An apparatus for practicing the method of the present invention is shown diagrammatically in FIG. 3. A tractor 14 pulls and powers a shredder 17. A tool bar 15 mounted behind the shredder 17 supports hilling discs 16. Pairs of such discs are spaced along the tool bar 15 in accord with the row spacing desired, several ridges being formed simultaneously.

The stalks and trash may be picked up and shredded by means of a flail type shredder 17 comprising a number of hammermill elements carried by a horizontal, transverse shaft. The housing 19 of the shredder may be used to direct the shredded material up over the toolbar 15 and terminates in several laterally spaced delivery chutes 20 which are downwardly directed and offset from the hilling discs 16 so as to deposit the shredded material in the valleys between ridges. The shredder 17 preferably is mounted between the tractor 14 and tool bar 15 and is driven from the usual tractor rear pto shaft.

If preferred, the shredded material discharged from the shredder 17 may be distributed more or less uniformly over the field after the ridging operation, relying on the wind and rain to carry the crop residue off of the ridges and into the valleys over a period of time after the ridging which is performed in late fall after harvesting.

The above-described machine is merely illustrative of equipment which might be used to practice the method of the present invention. It is possible to practice the method by means of other and different machinery and the scope of the method is not limited to use of the above-described machinery, but by the following claims.

I claim:

1. The method of preparing a field which has crop residue therein for subsequent row crop planting comprising removing the crop residue from the ground, shredding said residue, forming ridges in the cleared ground, and then redepositing the residue on the surface of the ground between said ridges behind the ridge-forming means so as to leave the tops of the ridges substantially clear of residue.

2. The method of preparing a field for subsequent row crop planting as clained in claim 1, in which pre-existing ridges are reformed.

3. The method of preparing a field for subsequent row crop planting as claimed in claim 1, in which the crop residue is removed and shredded, the ridges formed and the residue redeposited in a single pass over the field.

4. The method of preparing a field which has crop residue thereon for subsequent row crop planting, comprising removing the crop residue from the ground, shredding said residue, forming ridges in the cleared ground, and then depositing said residue on the surface of the ground in the furrows between the ridges so as to leave the tops of the ridges substantially clear of residue.

* * * * *